(12) United States Patent
Mheen et al.

(10) Patent No.: US 9,170,333 B2
(45) Date of Patent: Oct. 27, 2015

(54) DYNAMIC RANGE THREE-DIMENSIONAL IMAGE SYSTEM

(75) Inventors: Bongki Mheen, Daejeon (KR); Ki-Jun Sung, Chungcheongnam-do (KR); Jae-Sik Sim, Daejeon (KR); Kisoo Kim, Daejeon (KR); MyoungSook Oh, Daejeon (KR); Yong-Hwan Kwon, Daejeon (KR); Eun Soo Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 423 days.

(21) Appl. No.: 13/334,111

(22) Filed: Dec. 22, 2011

(65) Prior Publication Data

US 2012/0162373 A1 Jun. 28, 2012

(30) Foreign Application Priority Data

Dec. 23, 2010 (KR) ........................ 10-2010-0133636

(51) Int. Cl.
*H04N 13/02* (2006.01)
*G01S 17/89* (2006.01)
(Continued)

(52) U.S. Cl.
CPC ................. *G01S 17/89* (2013.01); *G01S 7/487* (2013.01); *G01S 7/4813* (2013.01); *G01S 7/4816* (2013.01); *G01S 7/4863* (2013.01); *G01S 7/4868* (2013.01); *G01S 7/4912* (2013.01);

(Continued)

(58) Field of Classification Search
CPC ......... H04N 7/183; H04N 7/18; H04N 7/147; H04N 13/0239; H04N 13/0296; G06T 5/50; G06T 5/008; G06T 5/009; G06T 5/007; G06T 5/002; G06T 5/003; G06T 5/40; G08B 13/19647; G08B 13/0271; G08B 13/025; G08B 13/0018; G08B 13/0022; G08B 13/004; G08B 13/0253
See application file for complete search history.

(56) References Cited

U.S. PATENT DOCUMENTS 7,379,100 B2 5/2008 Gokturk et al.
8,558,337 B2 * 10/2013 Maryfield et al. ............ 257/432
(Continued)

FOREIGN PATENT DOCUMENTS

JP 2009-213032 A 9/2009

OTHER PUBLICATIONS

Mitsuhito Mase et al., "A Wide Dynamic Range CMOS Image Sensor with Multiple Exposure-Time Signal Outputs and 12-bit Column-Parallel Cyclic A/D Converters", IEEE Journal of Solid-State Circuits, vol. 40, No. 12, pp. 2787-2795, Dec. 2005.

*Primary Examiner* — Tat Chio
(74) *Attorney, Agent, or Firm* — Rabin & Berdo, P.C.

(57) ABSTRACT

Disclosed is a system of a dynamic range three-dimensional image, including: an optical detector including a gain control terminal capable of controlling an optical amplification gain; a pixel detecting module for detecting a pixel signal for configuring an image by receiving an output of the optical detector; a high dynamic range (HDR) generating module for acquiring a dynamic range image by generating a signal indicating a saturation degree of the pixel signal and combining the pixel signal based on the pixel signal detected by the pixel detecting module; and a gain control signal generating module generating an output signal for supplying required voltage to the gain control terminal of the optical detector based on the magnitude of the signal indicating the saturation degree of the pixel signal.

18 Claims, 7 Drawing Sheets

(51) Int. Cl.
  *G01S 7/481*  (2006.01)
  *G01S 7/486*  (2006.01)
  *G01S 7/487*  (2006.01)
  *G01S 7/491*  (2006.01)
  *H04N 13/00*  (2006.01)

(52) U.S. Cl.
  CPC ........ *H04N 13/0007* (2013.01); *H04N 13/021* (2013.01); *H04N 13/0253* (2013.01); *H04N 13/0296* (2013.01)

(56) References Cited

U.S. PATENT DOCUMENTS

| | | | |
|---|---|---|---|
| 2001/0031143 A1* | 10/2001 | Kamon et al. | 396/121 |
| 2005/0052557 A1* | 3/2005 | Kusaka et al. | 348/308 |
| 2006/0176467 A1 | 8/2006 | Rafii et al. | |
| 2007/0268396 A1* | 11/2007 | Kurane | 348/362 |
| 2008/0237445 A1* | 10/2008 | Ikeno et al. | 250/205 |
| 2008/0316354 A1 | 12/2008 | Nilehn et al. | |
| 2009/0085926 A1* | 4/2009 | Kim et al. | 345/604 |

* cited by examiner

DYNAMIC RANGE THREE-DIMENSIONAL IMAGE SYSTEM

CROSS-REFERENCE TO RELATED APPLICATIONS

This application is based on and claims priority from Korean Patent Application No. 10-2010-0133636, filed on Dec. 23, 2010, with the Korean Intellectual Property Office, the present disclosure of which is incorporated herein in its entirety by reference.

TECHNICAL FIELD

The present disclosure relates to an electronic apparatus for acquiring three-dimensional images and pictures. More particularly, the present disclosure relates to a method and a system for acquiring three-dimensional images and pictures having a high dynamic range by using a detector having an optical amplification function.

BACKGROUND

Three-dimensional images and pictures have been increasingly used for various purposes and grown in importance for products using the three-dimensional images and pictures such as a three-dimensional display TV, and in order to acquire three-dimensional images for distant military targets, three-dimensional images for monitoring a natural environment such as a landslide, and various three-dimensional environments around a vehicle required for travelling of a unmanned automatic driving vehicle.

In the related art, even inferior-quality three-dimensional images served to perform their roles in some regions. However, in recent years, as application ranges of the three-dimensional images are extended, acquiring superior-quality three-dimensional images even under various environments has become important.

A method for acquiring the three-dimensional images may be implemented by various methods, and not a method of a reflection wave of a modulated optical signal but a method capable of acquiring the three-dimensional images by measuring a time of flight of the reflection wave of light is generally used. The method is characterized in that a measurable range can be set to be very wide and pulse recognition is simple. As another method, there is a method of acquiring reflection information by using a difference in characteristics between a modulated and returned signal and a signal outputted at that time when transmitting an optical signal. This method is more complicated in a system structure than the method using the measurement of the time of flight of the reflection wave of light and is limited in a measurement distance depending on a modulation characteristic, but can have a higher SNR characteristic, such that this method is partially used.

Further, there are various three-dimensional image acquiring methods, but a common problem is that it is not easy to acquire the dynamic range of the image. In the image, when the dynamic range, that is, an optical intensity difference between the brightest portion and the darkest portion is not maximized, the bright portion is too bright, such that it is difficult to distinguish an object and the dark portion is too dark, such that it is difficult to distinguish the object. In the case of the three-dimensional image, in a region without a sufficient dynamic range, not only simple image loss or SNR reduction of a corresponding part occur, but the form of the three-dimensional image to be acquired is lost.

In particular, the three-dimensional image is required in not only a dark portion but also a portion having an optical signal of a bright background such as the sun and optical reflectance of a reflector may also vary very variously depending on a type of a target object and a reflection angle, and as a result, a high dynamic range reception structure can be a very important factor under the above environment.

In the case of an existing general image, the image can be acquired under various exposure conditions by adjusting an integration time corresponding to a light receiving time to collect the optical signal or an aperture opening time in addition to improving a characteristic of an element in order to increase the dynamic range, and as a result, a high dynamic image can be ensured.

That is, regardless of a light detection time, a high dynamic range image can be acquired from an optical signal inputted into a pixel with relatively the same intensity while changing various conditions (the aperture opening time, and a driving time and a driving method of a detection device) by using the detection device having an excellent photo-sensing ability.

However, in the case of the three-dimensional image, since the reflection wave needs to be detected by using a very short optical signal, that is, an optical signal having a pulse width of 1 to 10 nsec in order to acquire high distance resolution and the detection time also needs to be as short as the time, a problem cannot be solved by increasing the integration time used in the existing general image or changing the driving time of the device.

Accordingly, when it is impossible to increase the dynamic range by merely changing the integration time, a method for increasing the dynamic range for the three-dimensional image or picture is required. In the related art, there is a method in which an automatic gain control (AGC) circuit is placed to control a gain of an amplifier such as a trans-impedance amplifier (TIA) in order to prevent signal saturation generated at the rear end of an optical detector such as an avalanche photodiode (APD).

SUMMARY

The present disclosure has been made in an effort to provide a system and a method for acquiring a higher dynamic range when acquiring a three-dimensional image.

The present disclosure has been made in an effort to apply not a method of controlling a gain at a next stage of an optical detector but a method of controlling the gain at the stage of the optical detector in order to improve a dynamic range of a three-dimensional image or picture without using a passive signal saturation preventing method in the related art.

The present disclosure has been made in an effort to provide a system that acquires a high dynamic range image or picture regardless of a material having high reflectance, sunlight, and a reflection angle to thereby acquire a three-dimensional image for a target more quickly and stably.

An exemplary embodiment of the present disclosure provides a system of a dynamic range three-dimensional image, including: an optical detector including a gain control terminal capable of controlling an optical amplification gain; a pixel detecting module for detecting a pixel signal for configuring an image by receiving an output of the optical detector; a high dynamic range (HDR) generating module for acquiring a dynamic range image by generating a signal indicating a saturation degree of the pixel signal and combining the pixel signal based on the pixel signal detected by the pixel detecting module; and a gain control signal generating module generating an output signal for supplying required voltage to the gain control terminal of the optical detector based on the magnitude of the signal indicating the saturation degree of the pixel signal.

According to the exemplary embodiments of the present disclosure, higher-quality three-dimensional images can be acquired even under various environments and conditions.

In particular, the three-dimensional images can be stably acquired even with respect to a condition in which the bright sun is present outdoors, various reflector materials, or a reflection angle of a reflector and moreover, when an object recognition algorithm is applied to the three-dimensional images, the target can be recognized stably and quickly.

Further, even an unmanned automatic vehicle placing the safety of pedestrians for security may be limited in acquiring three-dimensional images due to various reflectors such as a metal surface, glass, and a mirror, but when a technology of the present disclosure is applied, a stable three-dimensional image can be ensured.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
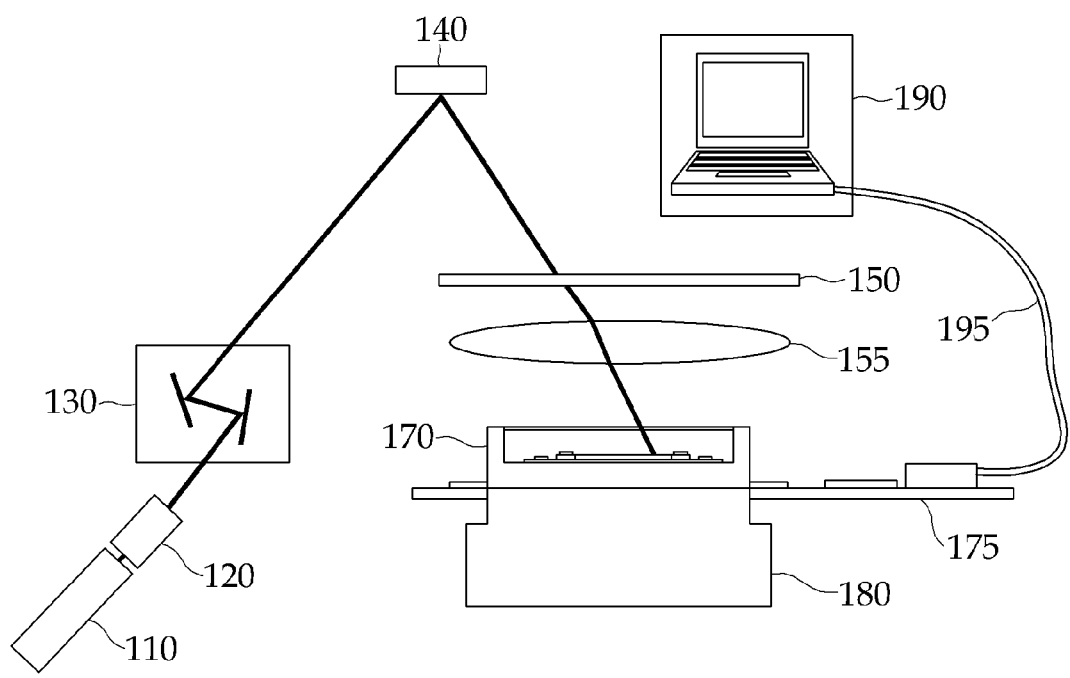
FIG. 1 is a block diagram schematically showing a configuration of a system acquiring three-dimensional images and pictures using a reflection time of an optical signal according to an exemplary embodiment of the present disclosure.

FIG. 1 is a block diagram schematically showing a configuration of a system acquiring three-dimensional images and pictures using a reflection time of an optical signal according to an exemplary embodiment of the present disclosure.

In FIG. 1, an optical reflection signal is primarily shown in order to describe a process of acquiring three-dimensional images, but a system configuration may be similarly applied to even an optical modulation type three-dimensional image.

First, a laser beam emitted from a pulse laser 100 for measuring a distance is outputted through a transmitting light optical system 120. In addition, light emitted from transmitting light optical system 120 is irradiated to a target region through an optical scanner 130 in order to be irradiated to a desired region. In this case, as used optical scanner 130, a stepping motor, a brushless DC motor, a rotating mirror, and a Galvano mirror may be used. Transmitting light optical system 120 and optical scanner 130 may be implemented as one form and the order of transmitting light optical system 120 and optical scanner 130 may be changed. The laser beam irradiated to a predetermined desired region through optical scanner 130 is reflected on a target 140 to be returned. In FIG. 1, a light path of a light transmitting laser and a light path of a light receiving laser are expressed differently from each other and this is called a dual axis structure. Unlike this, the light path of the light transmitting laser and the light path of the light receiving laser may be the same as each other (not shown) and such a structure is called a single-axis or uni-axial structure.

The laser beam reflected on target 140 to be returned passes through an optical filter 150 for blocking other noise light and thereafter, passes through a light receiving lens 155 for forming a focus to reach a receiving module 170. Herein, the order of optical filter 150 and light receiving lens 155 may be changed.

Receiving module 170 may include a temperature control module 180 for controlling the temperature of the module and may include an interface board 175 in order to output generated data. Interface board 175 may transmit data to an analyzing device 190 through a connection cable 195 by using various communication protocols such as a USB and a Gigabit Ethernet. Analyzing device 190 processes and displays the received data to acquire a final three-dimensional image. A detailed structure of receiving module 170 will be hereinafter described in detail with reference to FIG. 2.

Figure 2:
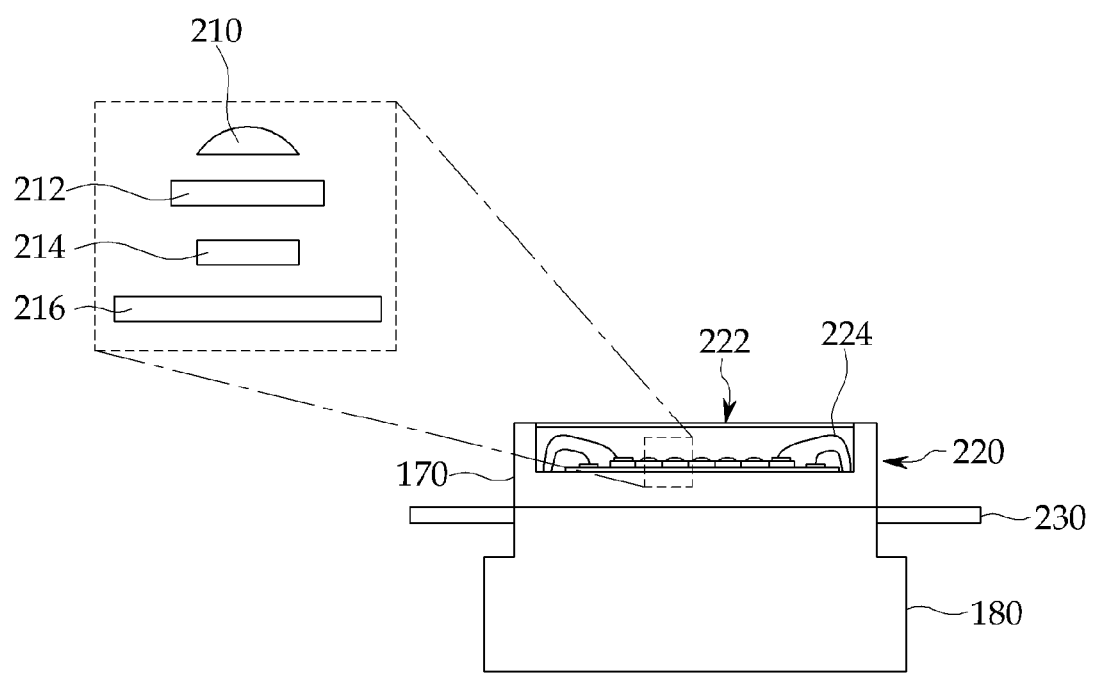
FIG. 2 is a structural diagram showing a receiving module of a system acquiring three-dimensional images and pictures according to an exemplary embodiment of the present disclosure.

FIG. 2 is a structural diagram more specifically showing receiving module 170 of FIG. 1 according to the exemplary embodiment of the present disclosure.

Receiving module 170 may include a package module 220 capable of detecting incident light and a temperature control module 180 for controlling the temperature of a part or the entirety of package module 220, which is positioned in the lower part thereof. Package module 220 may be implemented as a hermetic package because moisture in package module 220 may deteriorate detection performance as the temperature decreases. Temperature control module 180 may include a heat-sink for dissipating heat generated therefrom.

Receiving module 170 may include a package glass film 222 on the top thereof and light incident through package glass film 222 is inputted into an optical detector cell 212 by passing through a microlens 210. Optical detector 212 may be configured in an array pattern and gain control terminals may be connected into at least one group. In general, since optical detector cell 212 is implemented in the array pattern, each optical detector cell 212 has a unique output node and may include a flipchip connection pad 214 by using a bump technology which is an additional package structure in order to connect a readout IC (ROIC) 216 for processing the node. An optical signal detected by optical detector cell 212 through such a structure is processed to a desired type through ROIC 216 and the processing result has a connection structure through wire bonding 224 in order to connect an external pin 230 of receiving module 170.

The structure of receiving module 170 shown in FIG. 2 is just one exemplary embodiment and may be implemented in variously modified forms. In the present disclosure, driving of optical detector cell 212 in receiving module 170 is changed depending on the result of ROIC 216 to maximize the dynamic range of the image or picture finally acquired by receiving module 170.

Figure 3:
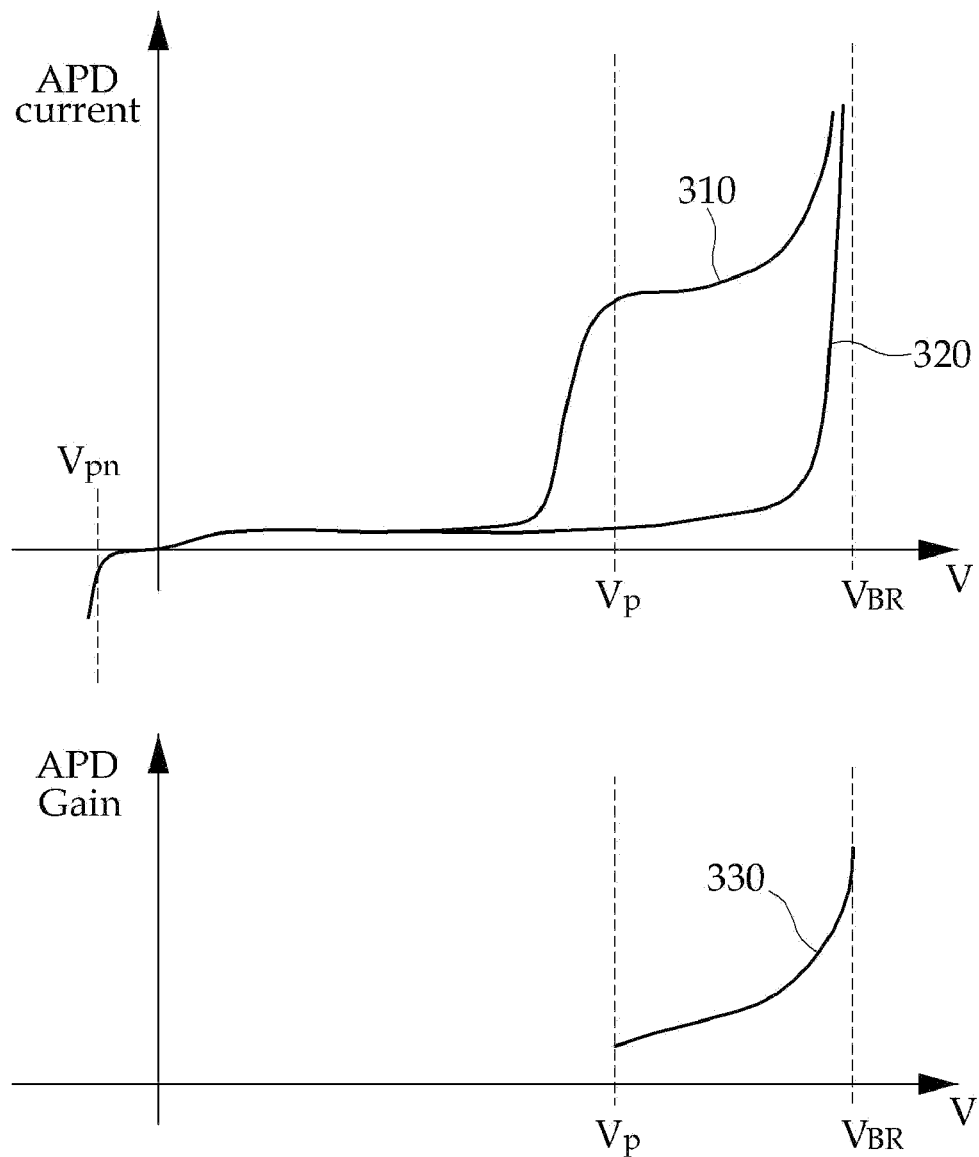
FIG. 3 is a diagram showing a voltage-current waveform and a gain characteristic of an APD.

For easier explanation, an avalanche photodiode is used as an exemplary embodiment of the optical detector including the gain control terminal capable of controlling the optical amplification gain in FIG. 3.

FIG. 3 is a diagram showing a voltage-current waveform and a gain characteristic of an APD.

FIG. 3 shows graphs relating to photo current 310 measured under a condition in which light is irradiated and dark current 320 measured under a completely dark condition. An X-axis and a Y-axis of each graph represents voltage applied in a reverse direction and current that flows at that time, respectively.

As shown in the figure, when voltage higher than punchthrough voltage Vp is applied, punch-through current flows under the condition of photo current 310 measured under the condition in which light is irradiated and there is no large change in the condition of dark current 320 where light is not completely present. On the contrary, when voltage higher than breakdown voltage VBR is applied, high breakdown current flows under the condition in which light is present and under the condition in which light is not present. In this case, a gain 330 depending on bias voltage is used in the present disclosure and a property in which the gain is rapidly changed at voltage between VP and VBR is used.

As seen in FIG. 3, a section in which a photocharge amplification gain is high is a section in which large bias voltage is applied and in this case, dark current 320 is high. That is, in this case, the photocharge amplification gain is high, but the section having the high photocharge amplification gain basically corresponds to a condition in which shot noise can be largely generated, such that a noise component contributing to a signal-to-noise ratio (SNR) becomes large. On the contrary, since dark current 320 is not large in a section in which the photocharge amplification gain is low, shot noise is small, and as a result, the noise component contributing to the SNR becomes advantageously small. Of course, since there is the photocharge amplification gain, final SNR calculation may be more complicated, but the description is adequate in an overall range and under a condition in which a signal is saturated at the maximum value, it is more advantageous to provide a method capable of reducing the noise component contributing to the SNR while avoiding the saturation.

Figure 4A:
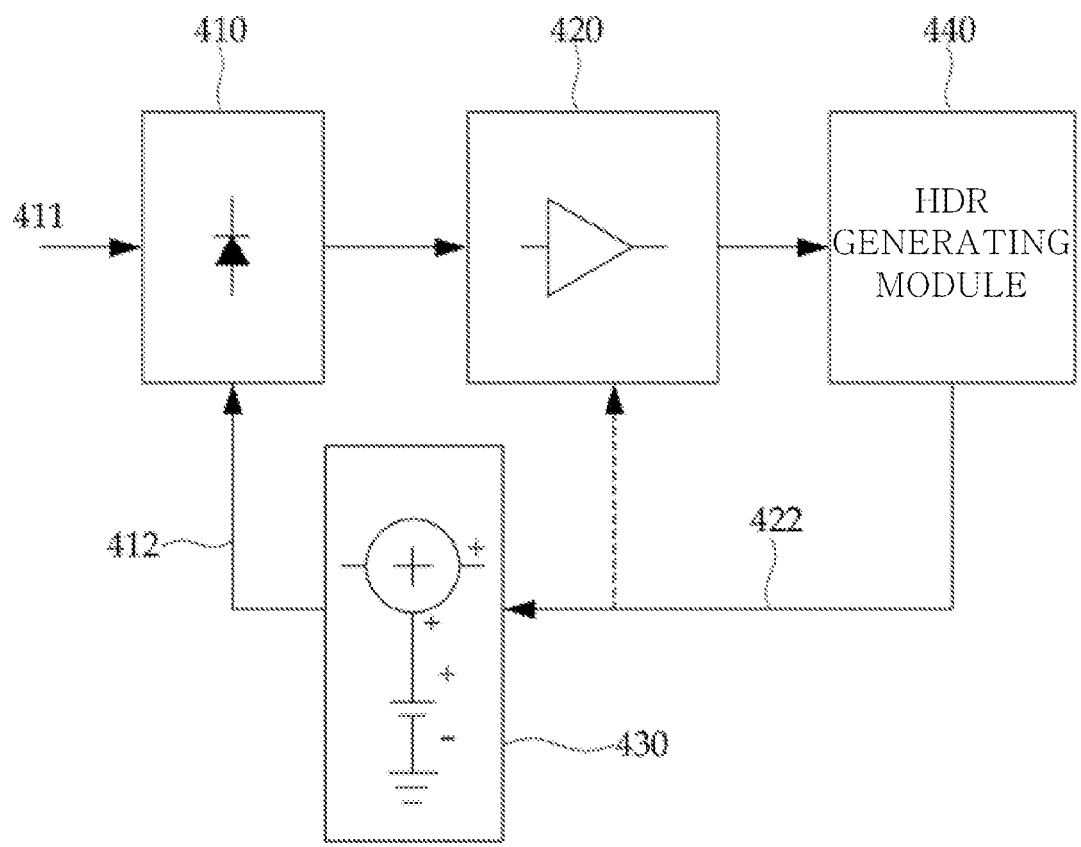
FIG. 4A is a block diagram schematically showing the structure of a wideband dynamic range three-dimensional image and picture system according to an exemplary embodiment of the present disclosure.

FIG. 4A is a block diagram schematically showing the structure of a wideband dynamic range three-dimensional image and picture system according to an exemplary embodiment of the present disclosure.

FIG. 4A is an exemplary embodiment of a system configuration implemented based on a principle described with reference to FIG. 3.

First, inputted incident light 411 is incident through an optical detector 410 including a gain control terminal capable of controlling an optical amplification gain and a generated optical signal is transferred to a pixel detecting module 420. In this case, the transferred optical signal is amplified at a predetermined amount and in this case, an amplification rate is controlled by an output signal 412 of a gain control signal generating module 430 that is inputted into the gain control terminal, which is another input. The gain control terminal of optical detector 410 may be formed by using a node applying bias voltage of a diode forming optical detector 410.

Pixel detecting module 420 receives an output of optical detector 410 to generate a pixel signal for configuring three-dimensional images. Pixel detecting module 420 basically amplifies the optical signal detected by optical detector 410, finds a desired signal component, and processes the found signal component. For example, the pixel detecting module may measure distance information based on a time of flight (TOF).

A high dynamic range (HDR) generating module 440 which is a next block of pixel detecting module 420 determines a saturation degree of the pixel signal based on the signal received from pixel detecting module 420, and generates and provides a signal 422 indicating the saturation degree of the pixel signal.

Signal 422 indicating the saturation degree of the pixel signal, which is generated as above, is provided to gain control signal generating module 430 to generate output signal 412 such as a voltage signal generating a required gain. A part of signal 422 indicating the saturation degree of the pixel signal is provided to pixel detecting module 420 to additionally control the gain.

Basically, output signal 412 outputted from gain control signal generating module 430 needs to have voltage which is higher than punch-through voltage VP and lower than breakdown voltage VBR as described above with reference to FIG. 3. As the optical signal of optical detector 410 is more and more saturated, output signal 412 of gain control signal generating module 430 needs to have a small value and at the same time, needs to generate output signal 412 of gain control signal generating module 430 which is the highest within a range in which the optical signal of optical detector 410 is not saturated. When the pixel signal is too weak, thus, close to a noise level to be difficult to distinguish, that is, the saturation degree of the pixel signal is lower than a predetermined reference, the optical gain of optical detector 410 is increased by generating voltage to increase output signal 412 outputted from gain control signal generating module 430, thereby improving the dynamic range.

For example, output signal 412 of gain control signal generating module 430 may be generated by adding punch-through voltage VP and voltage which is in proportion to a reciprocal number of the value indicating the saturation degree of the pixel signal generated from HDR generating module 440. In this case, when the optical signal is more and more saturated, output signal 412 of gain control signal generating module 430 has a small value and at the same time, output signal 412 of gain control signal generating module 430, which is the highest within the range in which the optical signal is not saturated, may be generated, and even in any case, voltage, which is equal to or higher than punch-through voltage VP, may be provided.

Figure 4B:
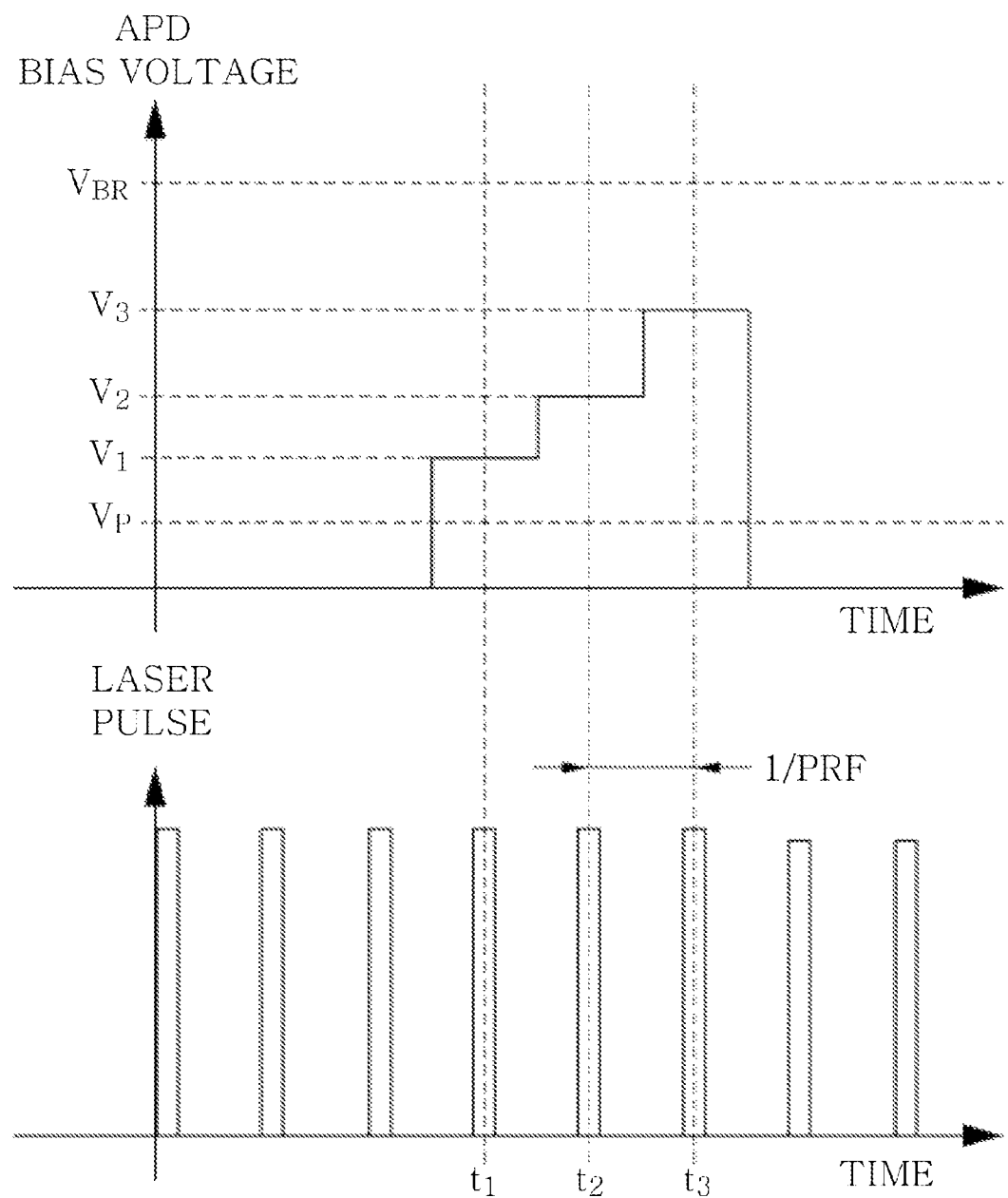
FIG. 4B is a timing diagram for forming an image by using a plurality of optical detectors having optical amplification rates of different conditions in the exemplary embodiment of FIG. 2.

FIG. 4B is a timing diagram for forming an image by using a plurality of optical detectors having optical amplification rates of different conditions in the exemplary embodiment of FIG. 2.

FIG. 4B is a reference diagram for describing that one optical detector operates in output signals 412 of different gain control signal generating modules 430 under repeated measurement conditions three times by using the principle described with reference to FIG. 4A. For example, the repeated measurement conditions may be generated differently for each frame of the image and may be generated differently every image measurement.

Output signal 412 of present gain control signal generating module 430 has a structure to detect the pixel signal at different times t1, t2, and t3 under V1, V2, and V3 and since a measurement value to be acquired under a condition of the same image has different dynamic range information, a very high dynamic range image or picture can be acquired when output signals 412 are coupled and synthesized with each other.

In FIG. 4B, measuring the signals at times t1, t2, and t3 adjacent to each other is exemplified, but signals at times not adjacent to each other may also be used. In FIG. 4B, three repeated measurements are exemplified, but various types of repetition patterns may be provided. For example, by arbitrarily adjusting the number of measurement times and changing output voltage signal 412 of each gain control signal generating module 430 applied to the number of repetition times, desired dynamic range image and picture signals may also be acquired.

In FIG. 4B, output signal 412 generated from gain control signal generating module 430 adopts step-shaped waveforms connected to each other even in a section other than a time when the optical signal such as a laser pulse is inputted, but is not limited thereto. For example, at t1, t2, and t3, the corresponding bias voltage is applied for only the time when the optical signal is inputted and bias voltage is not provided before next bias voltage is applied, such that it is possible to provide discontinuous bias voltage. That is, by applying not the step-shaped bias voltage but an impulse type bias voltage, the same effect as above can be achieved.

As described above, by controlling output voltage signal 412 of gain control signal generating module 430, the gain control terminal of optical detector 410 may be configured to have the repetition pattern or be applied with a pulse of a predetermined pattern repetitively twice or more.

HDR generating module 440 may acquire images/pictures of various optical amplification conditions with respect to the same or similar images/pictures from the above structure and acquire a high-quality image having the high dynamic range through processing such as image synthesis in order to acquire the high dynamic range.

A repetition cycle of an optical pulse is determined by a pulse repetition frequency (PRF) of an optical pulse laser and features associated therewith are as follows. Presently, the three-dimensional image is acquired by using a method of acquiring a three-dimensional image or picture by using various scanner techniques with a single detector and by using a method of acquiring a three-dimensional picture a flash light detection and ranging (LIDAR) method not using or minimizing the use of a scanner by forming the detector itself in an array and using the array as a focus surface array. The two methods are largely different from each other in an optical transmission system. The power of the pulse laser should be high in order to receive three-dimensional images inputted through a wide surface and when the high pulse laser is outputted, the PRF may be just low at approximately tens of Hz. That is, in the case of the flash LIDA, since the PRF is low, a time to change the bias of the APD is relatively long, and as a result, a required APD bias condition may be stably designated as necessary for each pulse condition.

Figure 5:
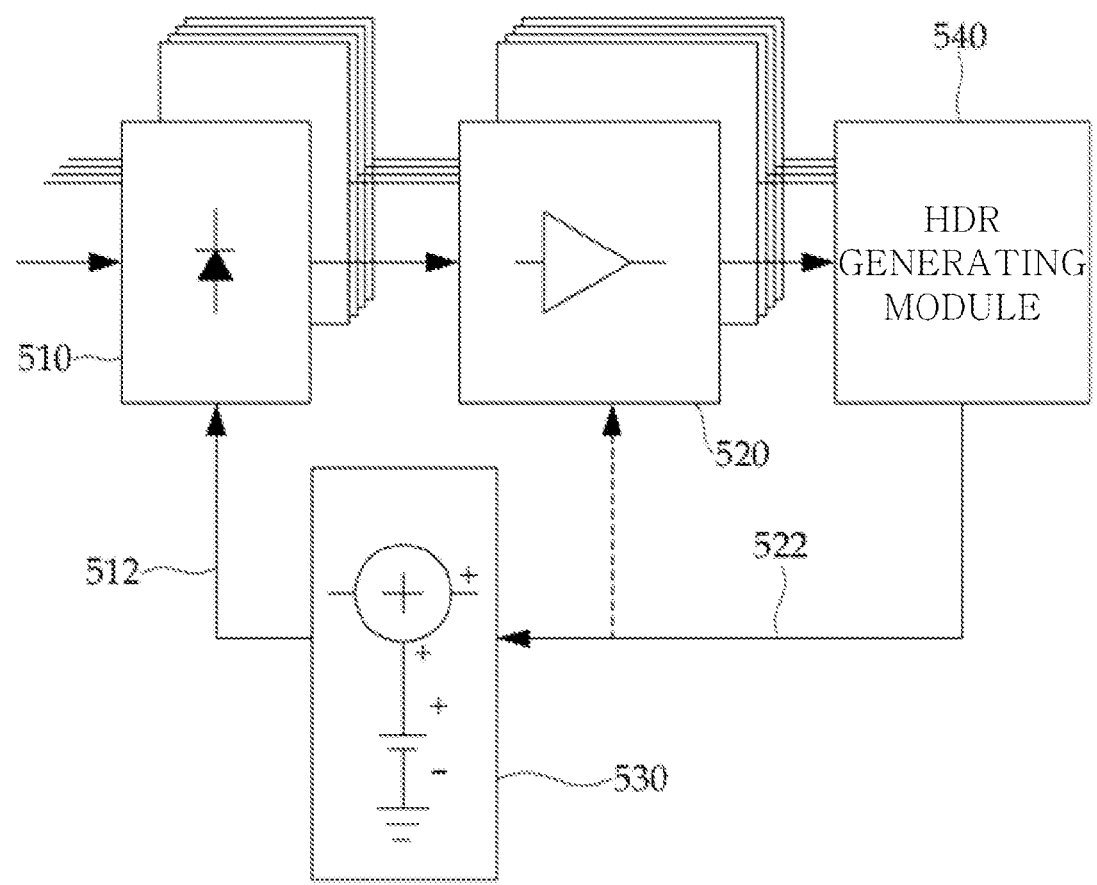
FIG. 5 is a diagram showing an exemplary embodiment for showing high dynamic range images and pictures in a system having two or more detection pixels according to an exemplary embodiment of the present disclosure.

FIG. 5 is a diagram showing an exemplary embodiment for showing high dynamic range images and pictures in a system having two or more detection pixels according to an exemplary embodiment of the present disclosure and is an exemplary embodiment for describing the description of FIG. 4A by using an optical detector array.

That is, the exemplary embodiment corresponds to a case in which a plurality of optical detectors, for example, 1×128 or 32×32 format 128 and 1024 optical detectors are provided. Even though plural optical detectors 510 are implemented in any format, plural optical detectors 510 may have a structure shown in FIG. 5. That is, optical detector cells 510 transmits an amplified output to pixel detecting modules 520 that take charge of optical detector cells 51, respectively and signals generated from pixel detecting modules 520 respectively are transferred to an HDR generating module 540 which is a next block as detection signals. HDR generating module 540 serves to generate the high dynamic range images and pictures by collecting results generated from the pixels, and determines a saturation state of a present image and generates signals 522 indicating the resulting saturation degree. The generated signals 522 are provided to a gain control signal generating module 530, and some of generated signals 522 are applied to pixel detecting module 520 to be used to control an internal amplification gain. In this case, an output signal 512 of gain control signal generating module 530 is the same as that under the condition of FIG. 4A. That is, basically, output signal 512 generated from gain control signal generating module 530 needs to have the voltage higher than VP and lower than VBR as described above, and as the optical detector is more and more saturated, signal 512 generated from gain control signal generating module 530 needs to have a small value, and the highest output signal 512 of gain control signal generating module 530 is generated within the range in which the optical detector is not saturated.

Figure 6:
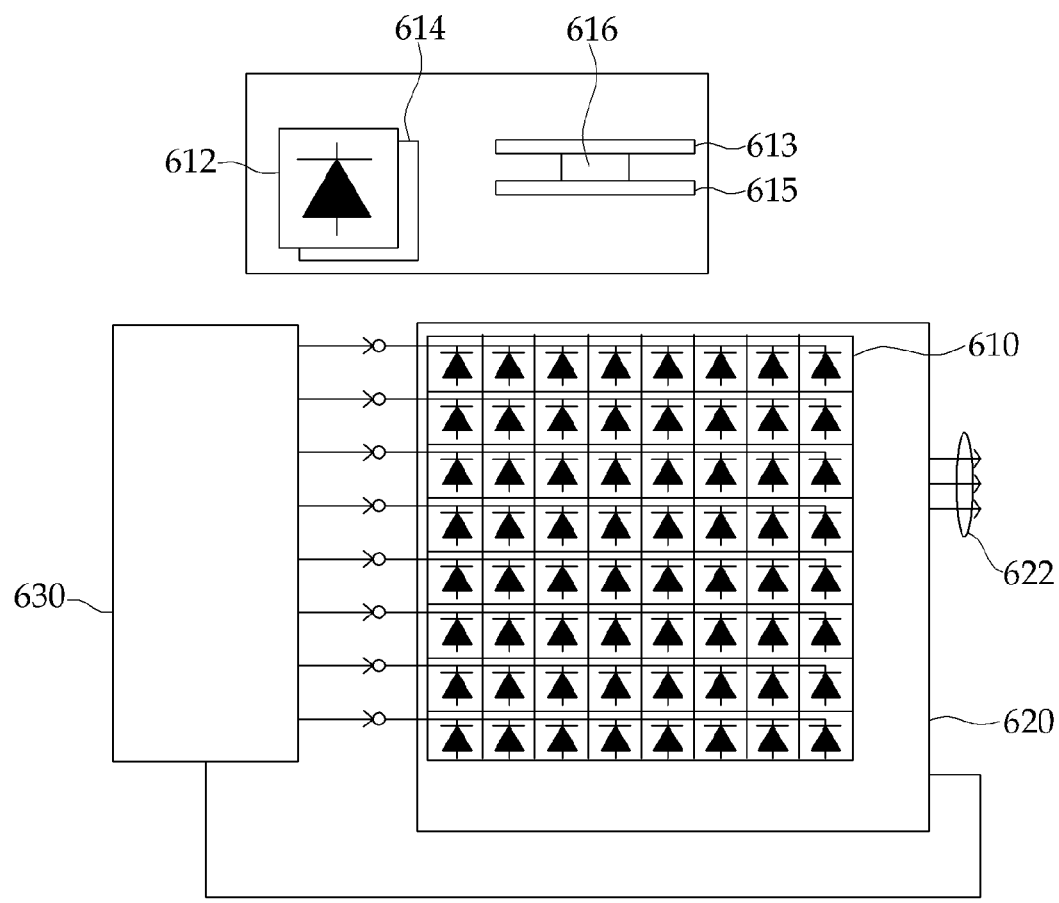
FIG. 6 is a diagram showing an exemplary embodiment for showing high dynamic range images and pictures in a structure of a detection pixel having an 8×8 array structure according to an exemplary embodiment of the present disclosure.

FIG. 6 is a diagram showing an exemplary embodiment when an optical detector (expressed as a photodiode in the figure) is implemented as a 8×8 format focal plane array 610 according to an exemplary embodiment of the present disclosure. The optical detectors are provided as a case of the optical detector viewed from the top 612 and a case of the optical detector viewed in a cross section 613. Both may be expressed as a case of a pixel detecting module taking charge of each optical detector viewed from the top (614) and a case of the pixel detecting module viewed in a cross section (615). A flipchip bump 616 for connecting each optical detector to the corresponding pixel detector module is positioned between the optical detector and the pixel detector to connect both the detectors to each other. The pixel detector may extend to an outer part of the optical detector as well as below the optical detector and image and picture signals processed through the region may be outputted through an external interface pin 622. An output signal indicating saturation degrees of the processed image and picture signals is provided to a gain control signal generating module 630 as shown in FIGS. 4A and 5 and generates an output in the same manner as FIGS. 4A and 5. In this case, an output signal 612 of gain control signal generating module 630 is the same as that under the condition of FIG. 4A. That is, basically, an output signal 631 generated from gain control signal generating module 630 needs to have the voltage higher than VP and lower than VBR as described above, and as the optical detector is more and more saturated, signal 631 generated from gain control signal generating module 630 needs to have a small value, and the highest output signal 631 of gain control signal generating module 630 is generated within the range in which the optical detector is not saturated.

Additionally, in FIG. 6, a gain control terminal capable of controlling a gain is provided for each line, but the gain control terminal may be divided into predetermined sections or formed as one node and gain control signal generating module 630 may generate a pulse to acquire a wideband dynamic range image under any situation. When a plurality of gain control terminal nodes are provided, a saturation degree of a pixel group corresponding to each gain control terminal may be acquired from an HDR generating module 620.

In the above description, output signal 631 of gain control signal generating module 630 is adjusted by HDR generating module 620, but as necessary, output signal 631 of gain control signal generating module 630 may be generated and outputted according to a predetermined sequence and method regardless of a pixel signal or image information inputted by HDR generating module 620. In this case, the predetermined sequence and method mean that voltage to be applied to the gain control terminal is determined beforehand so as to output a signal at an appropriate level even under various light intensities and sequentially applied.

For example, output signal 631 of gain control signal generating module 630 may be configured to have a repetition pattern. Output signal 631 of gain control signal generating module 630 may be configured to apply a pulse of a predetermined pattern twice or more.

In this case, HDR generating module 620 may acquire high dynamic range images/pictures from images acquired not from pixel information but by a predetermined pattern, sequence, and the number of repetition times.

In the present disclosure, HDR generating module 620 uses a plurality of images or a series of pictures in order to ensure the high dynamic range image as a synthesis of image/pictures having different optical amplifications. Among them, a region which cannot be distinguished due to a very weak signal may be provided or a region which is saturated due to a very strong signal may be provided. By combining the different images with each other, information on a dark part having a small reflection wave and information on a part having a large reflection wave are acquired and synthesized. Through these processes, the high dynamic range images/pictures can be finally acquired.

The optical detector with the gain control terminal capable of controlling the gain described in each exemplary embodiment may be easily described as the avalanche photodiode (APD). In this case, the gain control terminal corresponds to a terminal applying the bias voltage. The avalanche photodiode (APD) may be formed by a compound or silicon, or various other materials or processes. When a compound avalanche photodiode (APD) is used as the optical detector with the gain control terminal, for example, light may be absorbed by using an InGaAs device and light may be amplified by using an InAlAs device or an InP device. It is apparent that the optical detector according to the present disclosure can be applied and implemented with respect to all optical detectors with the gain control terminal as well as the avalanche photodiode (APD) described as above.

The present disclosure is described based on a three-dimensional image LIDAR system capable of acquiring three-dimensional images by calculating the time of flight (TOF) of the laser pulse for each pixel, but the present disclosure can be applied and implemented with respect to even a system with modulation such as a frequency modulation system in the same structure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A dynamic range three-dimensional image system, comprising:

an optical detector including a gain control terminal capable of controlling an optical amplification gain;

a pixel detecting module for detecting a pixel signal for configuring an image by receiving an output of the optical detector;

a high dynamic range (HDR) generating module for acquiring a dynamic range image by generating a signal indicating a saturation degree of the pixel signal and combining the pixel signal based on the pixel signal detected by the pixel detecting module; and a gain control signal generating module using the signal, as an input, indicating the saturation degree of the pixel signal and generating a voltage, as an output, which is more than a steady value for supplying the voltage to the gain control terminal of the optical detector, wherein the voltage is a value of adding a voltage which is in proportion to a reciprocal number of the signal indicating the saturation degree of the pixel signal to a punch-through voltage, and wherein the gain control signal generating module controls the optical detector including the gain control terminal.

2. The system of claim 1, wherein if it is judged that the pixel signal is saturated based on the signal indicating the saturation degree of the pixel signal received from the HDR generating module, the output of the gain control signal generating module is generated to decrease a gain of the optical detector.

3. The system of claim 1, wherein if it is judged that the saturation degree of the pixel signal is equal to or less than a predetermined reference based on the signal indicating the saturation degree of the pixel signal received from the HDR generating module, the output of the gain control signal generating module is generated to increase a gain of the optical detector.

4. The system of claim 1, wherein the output of the gain control signal generating module is higher than a punch-through voltage of the optical detector and lower than a breakdown voltage of the optical detector.

5. The system of claim 1, wherein the signal indicating the saturation degree of the pixel signal is transferred to the gain control signal generating module and the pixel detecting module.

6. The system of claim 1, wherein the output for supplying the gain control terminal is generated based on a predetermined pattern.

7. The system of claim 1, wherein the HDR generating module synthesizes the pixel signals measured under different optical amplification conditions.

8. The system of claim 1, wherein the optical detector is configured in an array pattern and the gain control terminal of the optical detector is tied into at least one group.

9. The system of claim 1, wherein the gain control terminal of the optical detector uses a node applying bias voltage to a diode forming the optical detector.

10. The system of claim 9, wherein as the optical detector, an avalanche photodiode (APD) including a light absorbing layer including InGaAs and a light amplifying layer including InP or InAlAs is used.

11. The system of claim 1, wherein the output of the gain control signal generating module varies depending on a measurement condition.

12. The system of claim 11, wherein the measurement condition is generated differently for each frame of the image.

13. The system of claim 11, wherein the gain control signal generating module generates different output voltages at each moment of measuring with respect to the same pixel signal.

14. The system of claim 1, wherein the pixel detecting module measures distance information based on a time of flight (TOF).

15. The system of claim 1, wherein the pixel detecting module measures distance information based on a frequency modulation method.

16. The system of claim 1, wherein the outputs generated by the gain control signal generating module are connected in shape even when an optical signal is not being inputted.

17. The system of claim 1, wherein the gain control signal generating module generates the output only when an optical signal is being inputted.

18. The system of claim 1, wherein the output of the gain control signal generating module is configured to have a repetition pattern.

* * * * *